United States Patent
Tellert (10) Patent No.: US 12,001,341 B2
(45) Date of Patent: Jun. 4, 2024

(54) DEVICE AND METHOD FOR STORING REAL-TIME DATA OF A MEDICAL TREATMENT

(71) Applicant: Fresenius Medical Care Deutschland GmbH, Bad Homburg (DE)

(72) Inventor: Wolfgang Tellert, Bad Homburg (DE)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 0 days.

(21) Appl. No.: 17/950,699

(22) Filed: Sep. 22, 2022

(65) Prior Publication Data

US 2023/0146655 A1 May 11, 2023

(30) Foreign Application Priority Data

Nov. 5, 2021 (EP) ..................................... 21206705

(51) Int. Cl.
  G06F 12/08 (2016.01)
  G06F 12/0875 (2016.01)
  G06F 12/0895 (2016.01)

(52) U.S. Cl.
  CPC ...... *G06F 12/0895* (2013.01); *G06F 12/0875* (2013.01); *G06F 2212/1032* (2013.01); *G06F 2212/17* (2013.01)

(58) Field of Classification Search
  None
  See application file for complete search history.

(56) References Cited

U.S. PATENT DOCUMENTS

| | | | |
|---|---|---|---|
| 5,560,352 A * | 10/1996 | Heim ..................... | G16H 20/40 128/204.21 |
| 5,904,708 A | 5/1999 | Goedeke | |
| 6,408,409 B1 * | 6/2002 | Williams .................. | G06F 5/10 714/763 |
| 2006/0149866 A1 * | 7/2006 | Arataki ................. | G06F 3/0689 710/52 |
| 2008/0229037 A1 * | 9/2008 | Bunte ................. | G06F 21/6218 711/E12.103 |
| 2009/0296540 A1 * | 12/2009 | Gilbert .................... | G11B 23/40 |
| 2013/0254464 A1 * | 9/2013 | Kimura ................. | G06F 3/0619 711/103 |
| 2015/0067000 A1 * | 3/2015 | Ravuna ................... | G16H 30/20 707/821 |
| 2017/0323119 A1 * | 11/2017 | Harp ................... | G06F 21/6254 |
| 2019/0365325 A1 * | 12/2019 | Reiner .................... | A61B 5/07 |
| 2021/0318925 A1 * | 10/2021 | Fusco .................... | G06F 9/542 |

* cited by examiner

Primary Examiner — Tracy C Chan
(74) *Attorney, Agent, or Firm* — Leydig, Voit & Mayer, Ltd.

(57) ABSTRACT

A system and method for failsafe storage of real-time data, for example, relating to a hemodialysis or peritoneal dialysis treatment, includes: temporarily storing the real-time data in a ring buffer memory; pre-allocating a set of storage units of a storage medium, which is supplied with an operating voltage, for storing the real-time data in a file system; and based on the operating voltage of the storage medium being within a predefined reference range, transferring the real-time data from the ring buffer memory to the storage medium and storing the real-time data on a storage unit of the storage medium. In case of error, the integrity, authenticity, and availability of the stored real-time data are ensured.

24 Claims, 4 Drawing Sheets

DEVICE AND METHOD FOR STORING REAL-TIME DATA OF A MEDICAL TREATMENT

CROSS-REFERENCE TO RELATED APPLICATION

Priority is claimed to European Patent Application No. EP 21206705.2, filed on Nov. 5, 2021, the entire disclosure of which is hereby incorporated by reference herein.

TECHNICAL FIELD

The present invention relates to a method for failsafe storage of real-time data. Furthermore, the present invention relates to a medical technology device for carrying out medical treatments, in particular dialysis treatments.

BACKGROUND

Medical technology devices permit patients having different physiological ailments to be treated and vital physical functions to be partially or completely replaced. The safety of the patient always has the highest priority here. The goal is, using suitable sensors, on the one hand to monitor the functionality of the device within established operating values and, on the other hand, to detect physiological processes of the patient, for example, in order to reliably recognize critical situations or predict or avoid them early with the aid of suitable algorithms Critical situations may include, for example, malfunctions of all types within the medical technology device or the components connected thereto, which influence the treatment carried out using the medical technology device. This can therefore result in complications for the patient, for example, due to an incorrect medication administration. Close monitoring of medical technology devices and treatments executed thereby is therefore advantageous.

Within the medical field of nephrology, kidney replacement therapy plays a prominent role. For this purpose, in particular devices which are technically configured for the purpose of carrying out dialysis treatments are used, which may be divided into hemodialysis treatments and peritoneal dialysis treatments. Hemodialysis is an extracorporeal method in which the blood to be purified is taken from the patient and guided past a special dialysis liquid, the dialysate, usually in counter flow extracorporeally within a dialysis filter via a semipermeable membrane.

The material concentration of the dialysate corresponds to the concentration of the blood of a healthy person. Due to the different material concentrations of blood and dialysate, the materials subject to urinary excretion diffuse through the membrane from the blood side of the membrane to the dialysate side, while at the same time electrolytes present in the blood and in the dialysate diffuse from the side of higher concentration to the side of lower concentration via the membrane of the dialysis filter. The metabolism can additionally be influenced by applying a transmembrane pressure and excess water can be removed from the blood.

In peritoneal dialysis, the well-perfused peritoneum of the patient is used as a dialysis filter. A special dialysis liquid is also used here and introduced into the abdomen of the patient, where primarily water and ions can be exchanged due to a concentration gradient between blood side and dialysate side. The function of the semipermeable membrane is assumed in peritoneal dialysis by the tissue in the abdomen here. The dialysate remains for an established time in the peritoneum of the patient for this purpose, before it is conducted out again with the dissolved materials and the additional water. In practice, special machines are used for at least partial automation of this method, for example, the sleep safe device from Fresenius Medical Care.

Medical technology devices such as dialysis devices have a plurality of sensors, which detect device and patient parameters. The medical treatment may be monitored or adjusted by corresponding evaluation of the detected parameters. Sensors of a dialysis device enable, for example, the measurement of pressure, conductivity, temperature, or the fluid composition of the blood or the dialysate. In addition, scales, cameras, microphones, and further devices and sensors may be installed in medical technology devices or may exchange data with them. Typical parameters which are measured in the course of a dialysis treatment may include, for example, the ultrafiltration volume, the blood or dialysate temperature, or the venous or arterial pressure.

The data read out from the sensors may be generated in running operation of the device before, during, or after the actual treatment and may be at least temporarily stored on a nonvolatile storage medium. In this case, the storage medium may be an internally permanently installed data carrier, e.g., a magnetic hard drive, a solid-state memory, and a combination thereof. Furthermore, data carriers which are not permanently installed may also be used, e.g., external magnetic hard drives, external solid-state memories, memory cards, smartcards, or USB sticks. For data which are acquired in the context of medical treatments, for example in the context of dialysis treatments, ensuring the data integrity, the confidentiality, and the availability of the data are of central importance. Comprehensive documentation of the treatment is advantageous to document the course of the treatment or in case of an unpredicted event, for example a device defect, to be able to analyze the event subsequently.

While data integrity corresponds to ensuring the correct and unchanged data content, ensuring the confidentiality of the acquired data corresponds to preventing unauthorized access to the content of the data or the meaning thereof. The availability of the data places demands on the data access which also has to be ensured in case of error. The data of the storage medium thus have to remain available and readable even in the case of an unpredictable event, for example due to a power failure.

In particular, in the case of real-time data, which are typically generated during the course of a dialysis treatment, the probability of data loss is increased. Real-time data are continuously generated by sensors of the medical technology device and are stored immediately or as soon as possible on a storage medium. For this purpose, new storage space is to be provided on the storage medium. Unpredicted events, for example power failures, can have the result that storage areas of the storage medium are written incompletely and/or incorrectly, which can result in complete data loss in the most unfavorable case.

SUMMARY

In an exemplary embodiment, the present invention provides a method for failsafe storage of real-time data relating to a medical treatment, comprising: temporarily storing the real-time data in a ring buffer memory; pre-allocating a set of storage units of a storage medium, which is supplied with an operating voltage, for storing the real-time data in a file system; and transferring the real-time data from the ring buffer memory to the storage medium and storing the real-time data on a storage unit of the storage medium only if the operating voltage of the storage medium is within a predefined reference range.

In a further exemplary embodiment, the file system is formatted as a file allocation table (FAT), extended file allocation table (exFAT), or new technology file system (NTFS).

In a further exemplary embodiment, the storage units of the ring buffer memory which retain the real-time data are provided with a sortable identification code and/or the storage units are transferred in sorted sequence onto the storage medium.

In a further exemplary embodiment, the real-time data contain metadata.

In a further exemplary embodiment, the metadata are selected from the group of recording information data or section information data, and/or wherein the metadata contain a physical sector number.

In a further exemplary embodiment, the real-time data are composed of individual elements, and wherein the elements contain an element code, the data length of the current element, and/or the data recorded in conjunction with the medical treatment.

In a further exemplary embodiment, the ring buffer memory is divided into multiple sub-buffer memories.

In a further exemplary embodiment, at least one sub-buffer memory provides storage units for data relating to a medical treatment, and one sub-buffer memory provides storage units for metadata, and one sub-buffer memory provides storage units for command data; or at least one sub-buffer memory provides storage units for data relating to a medical treatment and one sub-buffer memory provides storage units for metadata and one sub-buffer memory provides storage units for command data, and wherein in each case storage units of the sub-buffer memory for data relating to a medical treatment are temporarily stored together with storage units of the sub-buffer memory for command data, and/or in each case storage units of the sub-buffer memory for metadata are temporarily stored together with sectors of the sub-buffer memory for command data.

In a further exemplary embodiment, the storage units which retain the real-time data are each encrypted and/or authenticated; and/or at least one storage area of a storage unit which retains real-time data is provided for authentication data in each case.

In a further exemplary embodiment, the ring buffer memory, the sub-buffer memory, and/or the storage medium are subdivided into storage blocks, which are each composed of a fixed number of storage units.

In a further exemplary embodiment, the storage blocks receive a storage block identification code, which is selected from at least three differentiable storage block identification statuses; all storage blocks of the ring buffer memory or the sub-buffer memories are transferred during a sequence to the storage medium and wherein this process repeats progressively, so that a first sequence results and further sequences following the first sequence; the storage blocks within the first sequence have a first storage block identification status; the further sequences are characterized in that the storage blocks within the further sequences each have storage block identification statuses deviating from the storage block identification statuses of the storage blocks of the first sequence; the storage block identification statuses of the storage blocks of respectively one sequence of the further sequences each differ from a following sequence; the storage block identification statuses of the storage blocks of the further sequences form a repeating sequence of storage block identification statuses.

In another exemplary embodiment, the present invention provides a method for failsafe storage of real-time data, comprising: temporarily storing the real-time data in a ring buffer memory; pre-allocating a set of storage units of a storage medium, which is supplied with an operating voltage, for storing the real-time data in a file system; and based on the operating voltage of the storage medium being within a predefined reference range, transferring the real-time data from the ring buffer memory to the storage medium and storing the real-time data on a storage unit of the storage medium.

In a further exemplary embodiment, the file system is formatted as a file allocation table (FAT), an extended file allocation table (exFAT), or a new technology file system (NTFS).

In a further exemplary embodiment, storage units of the ring buffer memory which retain the real-time data are provided with a sortable identification code and/or are transferred in a sorted sequence onto the storage medium.

In a further exemplary embodiment, the real-time data comprises metadata.

In a further exemplary embodiment, the metadata includes recording information data or section information data; and/or the metadata includes a physical sector number.

In a further exemplary embodiment, the real-time data are composed of individual elements, wherein the individual elements comprise an element code, a data length of a current element, and/or data recorded in conjunction with a medical treatment.

In a further exemplary embodiment, the ring buffer memory is divided into multiple sub-buffer memories.

In a further exemplary embodiment, at least one sub-buffer memory provides storage units for data relating to a medical treatment, at least one sub-buffer memory provides storage units for metadata, and at least one sub-buffer memory provides storage units for command data.

In a further exemplary embodiment, at least one sub-buffer memory provides storage units for data relating to a medical treatment, at least one sub-buffer memory provides storage units for metadata, and at least one sub-buffer memory provides storage units for command data; and the storage units of the at least one sub-buffer memory for the data relating to the medical treatment are temporarily stored together with the storage units of the at least one sub-buffer memory for the command data.

In a further exemplary embodiment, at least one sub-buffer memory provides storage units for data relating to a medical treatment, at least one sub-buffer memory provides storage units for metadata, and at least one sub-buffer memory provides storage units for command data; and the storage units of the at least one sub-buffer memory for the metadata are temporarily stored together with the storage units of the at least one sub-buffer memory for the command data.

In a further exemplary embodiment, the storage units which retain the real-time data are each encrypted and/or authenticated.

In a further exemplary embodiment, at least one storage area of a storage unit which retains real-time data is provided for authentication data.

In a further exemplary embodiment, the ring buffer memory and/or the storage medium are subdivided into storage blocks which are each composed of a fixed number of storage units.

In a further exemplary embodiment, the storage blocks receive a storage block identification code which is selected from at least three differentiable storage block identification statuses; all storage blocks of the ring buffer memory are transferred during a sequence to the storage medium in a progressively repeating manner such that a first sequence results and further sequences follow the first sequence; the storage blocks within the first sequence have a first storage block identification status; the storage blocks within the further sequences each have storage block identification statuses deviating from the storage block identification statuses of the storage blocks of the first sequence; the storage block identification statuses of the storage blocks of one respective sequence of the further sequences each differ from a following sequence; and the storage block identification statuses of the storage blocks of the further sequences form a repeating sequence of storage block identification statuses.

In yet another exemplary embodiment, the present invention provides a device, comprising: sensors configured for recording real-time data; a data interface configured for data transfer of the real-time data; a storage medium configured to be supplied with an operating voltage and written with the real-time data via the data interface, wherein a set of storage units of the storage medium is pre-allocated for storing the real-time data in a file system of the storage medium; and a ring buffer memory for temporarily storing the real-time data; wherein the device is configured to transfer the real-time data from the ring buffer memory to the storage medium and to store the real-time data on a storage unit of the storage medium based on a measured value of the operating voltage being within a predefined reference range.

In a further exemplary embodiment, the device is a hemodialysis, hemofiltration, hemodiafiltration, peritoneal dialysis, apheresis or plasmapheresis device.

In yet another exemplary embodiment, the present invention provides a non-transitory computer-readable medium having processor-executable instructions stored thereon for failsafe storage of real-time data, wherein the processor-executable instructions, when executed, facilitate: temporarily storing the real-time data in a ring buffer memory; pre-allocating a set of storage units of a storage medium, which is supplied with an operating voltage, for storing the real-time data in a file system; and based on the operating voltage of the storage medium being within a predefined reference range, transferring the real-time data from the ring buffer memory to the storage medium and storing the real-time data on a storage unit of the storage medium.

BRIEF DESCRIPTION OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. Features and advantages of various embodiments of the present invention will become apparent by reading the following detailed description with reference to the attached drawings which illustrate the following FIG. 1 schematically shows a medical technology device according to an embodiment of the invention.

DETAILED DESCRIPTION

Exemplary embodiments of the present invention provide improved security for storing real-time data of a medical treatment, in order to avoid data losses, and to ensure the confidentiality and the authenticity of sensitive medical data.

Exemplary embodiments of the present invention includes a method, a medical technology device, a computer program, and a computer-readable data carrier.

Accordingly, a method according to an exemplary embodiment enables failsafe storage of real-time data which relate to a medical treatment. The method comprises the temporary storage of the real-time data in a ring buffer memory, the pre-allocation of a set of storage units of a storage medium, which are supplied with an operating voltage, for storing the real-time data in a file system, wherein the transfer of the real-time data from the ring buffer memory to a storage unit of the storage medium only takes place when the operating voltage of the storage medium is within a predefined reference range.

Furthermore, a medical technology device for carrying out a medical treatment is provided. The medical technology device has sensors which are configured to record real-time data relating to a medical treatment. Furthermore, the medical technology device according to the invention has a data interface for the data transfer of the real-time data, and a storage medium, which is supplied with an operating voltage, and is written with the real-time data via the data interface. A set of storage units of the storage medium is pre-allocated for this purpose for storing the real-time data in a file system of the storage medium. The medical device furthermore has a ring buffer memory for the temporary storage of the real-time data, wherein the medical device is configured to transfer the real-time data from the ring buffer memory to the storage medium and to only store the data on a storage unit of the storage medium when a measured value of the operating voltage is within a predefined reference range.

In addition, a computer program is provided which comprises commands which, upon the execution of the program by a computer, prompt it to carry out a method according to the invention.

A computer-readable data carrier, on which the computer program is stored, is also provided.

Figure 1:
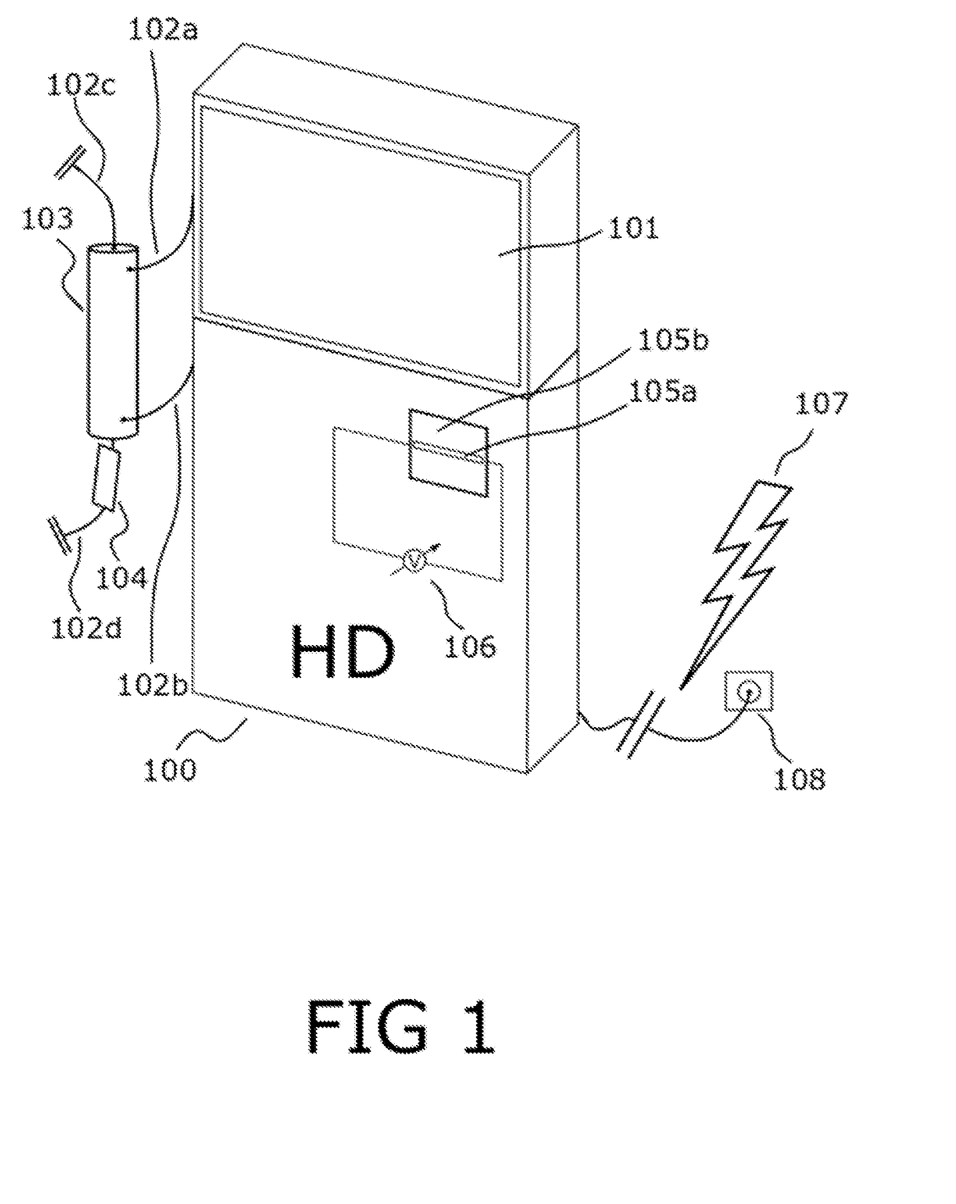

FIG. 1 shows a medical technology device according to the invention embodied as a hemodialysis device (HD) 100. Further embodiments of the medical technology device may include hemofiltration devices, hemodiafiltration devices, peritoneal dialysis devices, apheresis devices, or plasmapheresis devices. In general, the present invention may be applied to any medical technology devices in which real-time data are generated and stored in operation.

Real-time data may include all data here which are generated directly from operating values and patient values without a transformation or on the basis of a mathematical rule, for example using a stored algorithm. The hemodialysis device may furthermore have a user interface, for example a touchscreen 101. Further embodiments include other user interfaces which permit an interaction between a user and an electronic device.

The dialysis device of FIG. 1 furthermore has tubing lines 102a-102d, shown in simplified form, for the separate fluid transport of blood 102c, 102d and dialysis liquid 102a, 102b, which are brought into contact with one another in a dialysis filter 103 via a semipermeable membrane. A dialysis device generally moreover has a plurality of sensors, for example, ultrasonic or optical sensors 104, for example to detect air inclusions in the fluid lines. Further sensors may include pressure sensors, temperature sensors, or voltage sensors.

Other sensors may determine the activity and settings of installed actuators. Further sensors may measure values or parameters which are generated due to the internal communication of the individual components of the medical technology device. These may include status values of individual components, for example pumps, processors, storage media, input or output devices, or the sensors of the medical technology device. Status values are in this case all measured values which relate to activity and/or the correct functionality of the components. One example of such a status value is an acoustic, optical, electrical, magnetic, or electromagnetic signal which signals the activity of the components of a control device of the medical technology device. Further examples of status values include operating temperatures or operating voltage of individual components of the medical technology device.

Monitoring the status values is performed to ensure that the medical technology device and its individual components are operated within previously established operating values, for example within established voltage, pressure, or temperature values. On the other hand, it can be determined in this way whether critical deviations are present, which require an immediate reaction. Examples of a reaction include setting the medical technology device into a safe state, displaying an alarm, a warning, or automatic or manual correction on the part of the medical personnel or a service technician.

FIG. 1 furthermore shows an embodiment of a storage medium in the form of a secure digital memory card (SD card) 105a in combination with an SD card write-read device 105b, which is configured to store real-time data relating to a medical treatment on the SD card. Further embodiments of the storage medium may include internal or external hard drives, e.g., magnetic or solid-state memories and writable optical data carriers, e.g., compact discs, digital versatile discs (DVDs), or Blu-ray discs in combination with a respective write-read device configured for this purpose. Storage media may further include forms of semiconductor memories, as well as electrical or magnetic data memories in combination with read-write devices configured for this purpose.

Furthermore, FIG. 1 schematically shows that the operating voltage of the SD card write-read device 105b is measured by a voltmeter 106. In one embodiment, the storage medium may alternatively or additionally itself have an internally installed voltmeter, for example using an A/D converter, for measuring the operating voltage, which measures it and may send the values to a control device via an interface of the storage medium.

According to the invention, the control device is configured to read in the measured operating voltage and compare it to a previously defined reference range. If the control device establishes that the measured operating voltage is within the reference range, the real-time data are stored on a storage unit of the storage medium. A storage unit may be understood here as a sector on a storage medium or an elementary data range, for example, a storage cell on a ring buffer memory according to the invention. A sector is to be understood here as a predefined number of bits or bytes on the storage medium which can be defined by the underlying formatting of the storage medium by a file system or the physical architecture of the storage medium.

The ring buffer memory has a cyclic structure, so that upon reaching the last storage unit of the ring buffer memory, the first storage unit of the ring buffer memory is accessed again, so that it is continuously overwritten. This may be achieved, for example, by using a memory reference in the form of a pointer or index.

Examples of known formats by a file system of storage media, which may be established beforehand, for example, by an operating system of the medical technology device, are file allocation table (FAT), extended file allocation table (exFAT), or new technology file system (NTFS). A storage medium moreover has physical sectors which are defined on the basis of the physical architecture of the storage medium and may generally be uniquely addressed or located on the storage medium via a physical sector number. Examples of known addressing methods of physical sectors comprise cylinder head sector addressing or logical block addressing.

According to the invention, the real-time data are only transferred from the ring buffer memory to the storage medium when the operating voltage of the storage medium is within a predefined reference range. If the voltmeter 106 should measure an operating voltage outside a reference range, for example as a result of variations of the grid voltage or a power failure, the writing of the real-time data on a storage unit of the storage medium may be, for example, interrupted or prevented. A power failure is symbolized as a possible example of an unpredicted event by the lightning symbol 107 in FIG. 1, wherein the hemodialysis device is disconnected from the supply with electrical energy in the short term and without prior warning. In this case, the voltmeter 106 measures an operating voltage value which is outside the reference range, for example below a critical operating voltage value, whereupon a further transfer or writing of the real-time data on the storage medium is prevented by the control device.

A further example of an unpredicted event relates to a voltage variation of the grid voltage, as a result of which the operating voltage may be outside the reference range. The voltmeter 106 or the control device itself may be supplied with electrical energy via a secondary energy source in such cases. Secondary energy sources are, for example, capacitors and/or batteries.

Transferring the real-time data from the ring buffer memory to the storage medium and writing the real-time data on the next storage unit only when the measured operating voltage is within a reference range offers the advantage that generating incompletely or incorrectly written storage units is prevented, so that the probability of data loss is reduced.

Figure 2:
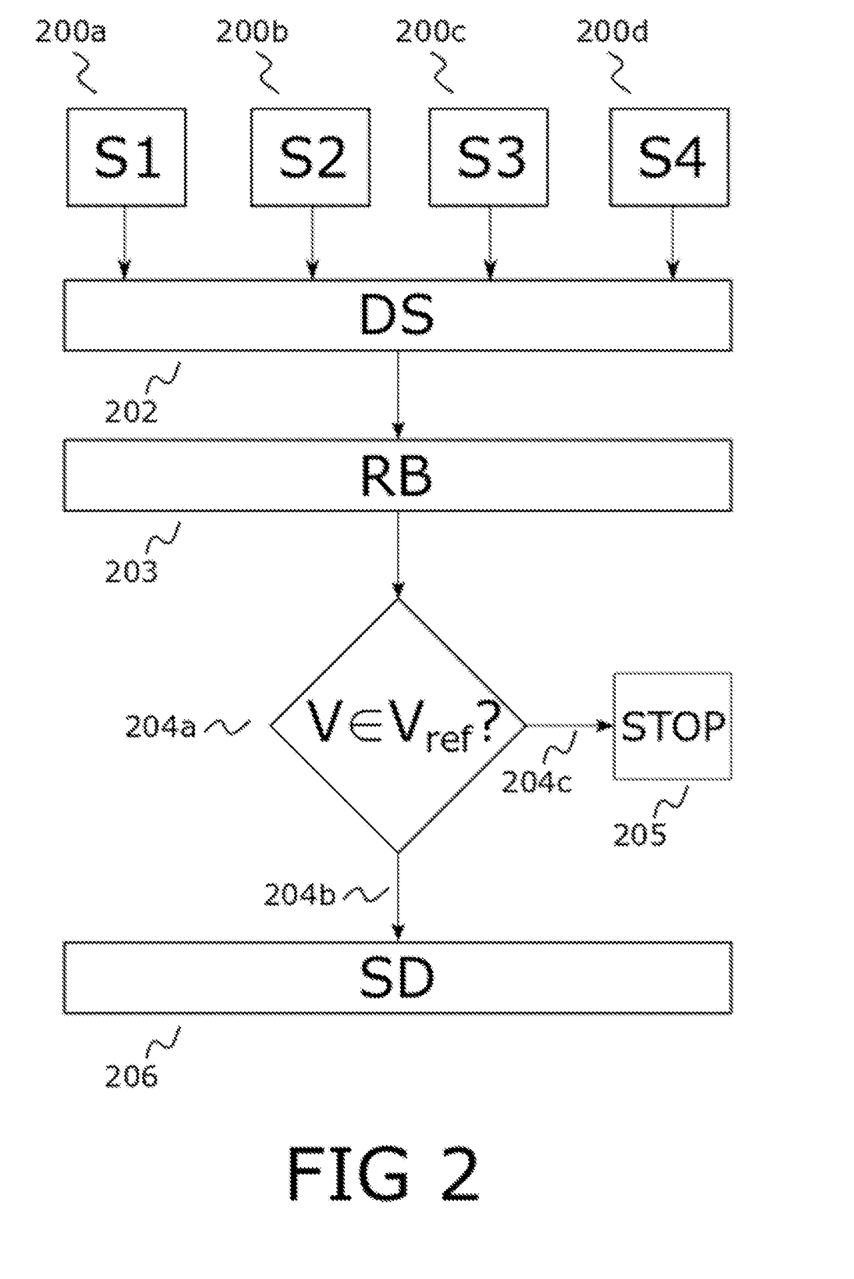
FIG. 2 schematically shows a method according to an embodiment of the invention.

FIG. 2 schematically shows a method according to the invention for failsafe storage of real-time data. The sensors 200a-200d of the medical technology device acquire a plurality of operating parameters or patient values to generate real-time data therefrom. This may be carried out using integrated circuits within the sensor components or at later times by a control device, for example a processor.

The real-time data are first stored temporarily on a ring buffer memory 203 via a data interface 202, before these data are stored on the storage medium 206. The data interface 202 may be wireless or wired hardware interfaces and a combination thereof. Examples of hardware interfaces include peripheral component interconnect (PCI) bus, accelerated graphics port (AGP), small computer system interface (SCSI), universal serial bus (USB), Bluetooth, or Wi-Fi. Further data interfaces 202 may include software interfaces which are configured for interprocess communication or for individual program components. The sensors 200a-200d may also communicate via wireless data interfaces with the ring buffer memory 203, the storage medium 206, and the remaining medical technology device 100.

The ring buffer memory as a data structure may be generated in the main memory of the medical technology device or in a memory of a data processing device in communication with the medical technology device, for example an external computer. By using a ring buffer memory, real-time data may be logged which would not be acquired by the storage medium due to parallel read-write accesses on the storage medium 206. For this purpose, the storage units of the ring buffer memory 203 are accessed in a previously established sequence to transfer the real-time data in succession to the storage medium 206. The sequence may be established here, for example, by an index of the individual storage units on the ring buffer memory.

The medical technology device furthermore has a control device 204a, which initiates the writing of the real-time data from the ring buffer memory 203 to the storage medium 206 if the operating voltage V is within a reference range Vref. Furthermore, the transfer or writing of the real-time data from the ring buffer memory 203 on the storage medium 206 may be temporarily interrupted or completely stopped 204c/205 if the operating voltage V is outside the reference range Vref.

The storage area required for the real-time data on the storage medium 206 or on the ring buffer memory 203 is pre-allocated according to the invention. A pre-allocation is understood in this context as a reservation or provision of a previously established number or a range of sectors or memory addresses on a storage medium. In the pre-allocation according to the invention, this is already initiated before the running operation, i.e., before recording the real-time data. A pre-allocation is particularly advantageous here upon use of storage media having hierarchical file systems, for example FAT. In hierarchical file systems, two sectors of the storage medium have to be accessed during each write process. In the case of an interruption of the voltage supply of the medical technology device or the storage medium, in particular between the accesses to both sectors, in that, for example, an SD card from a read-write device of the medical technology device is removed during a data access on the SD card, the integrity and availability of the file system on the storage medium and thus the real-time data can be endangered. However, both integrity and also availability are ensured by the method and device according to the invention.

Figure 3A:
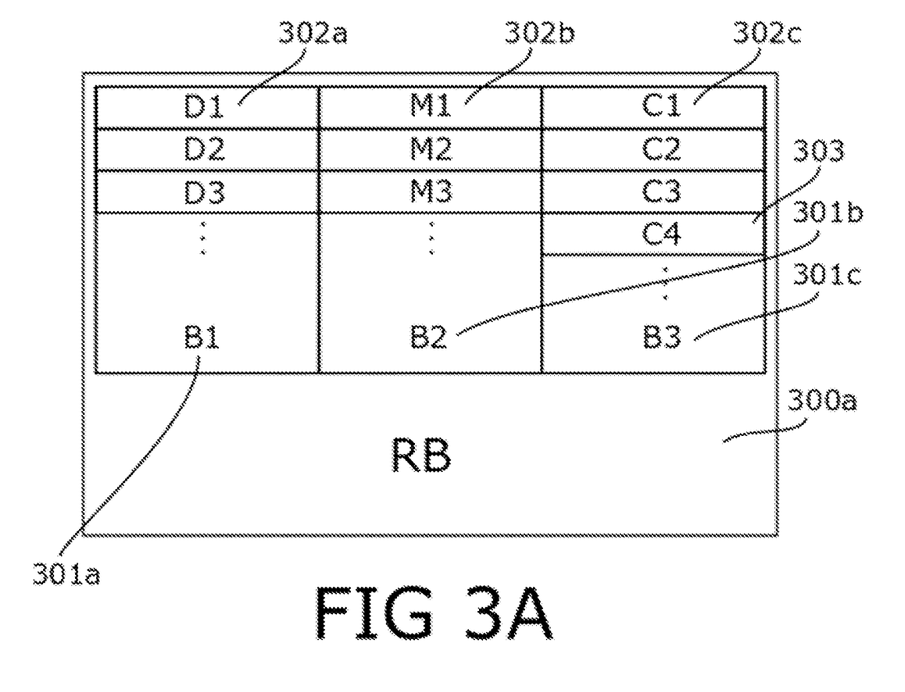
FIG. 3A schematically shows a ring buffer memory according to an embodiment of the invention.
Figure 3B:
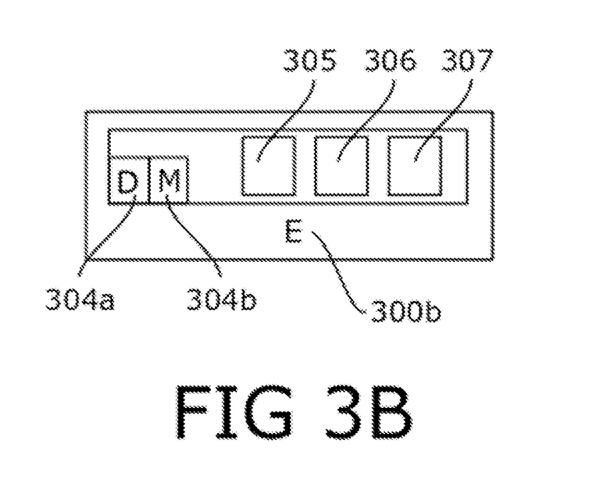
FIG. 3B shows a schematic detail view of a single element of a data structure according to an embodiment of the invention.

FIGS. 3a and 3b show further embodiments of a ring buffer memory 300a and a data structure of the real-time data 300b. In this case, the ring buffer memory 300a is divided into at least three sub-buffer memories 301a-301c, which are configured to temporarily store real-time data. A sub-buffer memory 301a may provide storage units for data 302a here. A further sub-buffer memory 301b may provide storage units for metadata 302b with respect to data. An additional sub-buffer memory 301c may provide storage units for command data 302c.

A subdivision of the ring buffer memory 300a into a plurality of sub-buffer memories 301a-301c permits the real-time data not to be subdivided as individual independent and successive storage units, but rather into sections independent of the storage units, so that access times are reduced and the resource efficiency of the medical technology device is improved overall.

Metadata 302b comprise data which may be generated in conjunction with the storage process of the data 302a. For example, metadata comprise additional items of information with respect to the storage location of the data 302a or the present read-write position, in that, for example, a physical sector number or a sector number of a file system is stored on the storage medium or ring buffer memory. Furthermore, metadata may store items of information with respect to the byte length of the previous, present, or following element of the real-time data. In this context, an element comprises a previously determined data structure, for example consisting of data 302a and/or data 302b, which is generated in the storage process. It is ensured by the described redundant data storage architecture that in case of error, a reconstruction of the data 302a and the integrity and availability of the stored real-time data on the storage medium are enabled.

Metadata 302b may furthermore include section information data and/or recording information data. Recording information data or section information data are stored on storage units configured for this purpose on the ring buffer memory or the storage medium.

Recording information data may include, for example, a byte number which a storage unit forms on the storage medium and/or a number of storage units which form a storage block. Furthermore, recording information data may include data with respect to the validity status of the data stream, the present writing position of a storage unit or a storage block on the storage medium, and the present data carrier position. The validity status comprises in this case a status stored in the recording data, for example an alphanumeric index value. The index value defines whether the relevant real-time data can be permanently stored or can be overwritten during a next writing process. The data carrier position comprises, in the case of a FAT/exFAT file system, the cluster number and the cluster-relative sector number. The present writing position may be understood here as the position of the last written storage unit of the data 302a of the progressively written storage units.

Section information data may provide, for example, information as to whether a fixed number of storage units have already been stored or transferred.

Command data 302c comprise a plurality of computer-readable command orders, which are configured to carry out a plurality of operations on the basis of the data 302a, the metadata 302b, and/or the command data 302c themselves. Examples of possible operations comprise the transfer of sectors filled incompletely or completely with data 302a from the ring buffer memory 300a to the storage medium, the transfer of a sector filled with metadata from the ring buffer memory 300a to the storage medium, or the reset of the ring buffer memory to a predefined storage unit, for example, to the first data storage unit D1, metadata storage unit Ml, or command storage unit Cl.

The individual sub-buffer memories may furthermore include different sizes with respect to the number in bytes or the provided storage units. For example, the sub-buffer memory 301c provided for command data may include more storage units 303 than the sub-buffer memories 301a-301b, since command data 302a may include operations with respect to the data 302a, the metadata 302b, and/or the command data 302c.

In a further embodiment, the storage units are provided on the ring buffer memory 300a in a sorted sequence. The sequence may be given here via the command data 302c or an alphanumeric value. In this case, during the read-write process, the storage units of the ring buffer memory 300a or the sub-buffer memories 301a-301c are processed in a sequence established on the basis of the identification code, wherein the storage units stored on the storage medium in this sequence may include data 302a, metadata 302b, and command data 302c.

In a further embodiment, the FAT/exFAT application programming interface (API) may be expanded with functions or programs to reduce the access times to the real-time data stored on the storage medium. An API is a programming interface and comprises a program part of a software system to enable a data communication with other programs or software systems. The following functions or programs are examples of an expanded FAT/exFAT API:

In one example, the physical sector number of a present write-read position of a data storage location on the storage medium is identified and stored, wherein the data storage location may be identified by an index. The index may be a unique alphanumeric symbol sequence suitable for identification of the data storage location. These data storage locations may include a set of storage units which store recording information data or section information data.

In a further example, the present read-write position may be set to a data storage location, which may be identified by an index, using a known physical sector number.

In a further example, a physical sector number of an element of the real-time data may be stored in the metadata, for example, recording information data or section information data, of the claimed element of the underlying data structure.

FIG. 3B shows a further embodiment of a data structure of real-time data which are provided as elements 300b. An element 300b may be composed here of data 304a and metadata 304b. The elements may moreover have an established structure to ensure time-efficient and resource-efficient storage of the real-time data while simultaneously ensuring the availability and integrity of the stored real-time data.

In this example, the elements have at least one element code 305, for example an alphanumeric symbol sequence, to distinguish the element type of the previous, present, and/or following element. Additionally or alternatively, the elements comprise a data length, for example in bytes 306 of the previous, present, or following element, wherein the dimension specification may be stored at least once in the element 300b. In addition, the elements 300b comprise the recorded real-time data 307.

The technical effect of this data structure permits error correction in case of error and secures the data stream against data losses due to random events. Random events include, for example, missing storage units, for example sectors, or a missing set of storage units or unintended modifications of the real-time data by random bit flips, i.e., random and unpredictable state changes of single bits. For example, error recognition is enabled in that the stored length in bytes in the element is compared to the actual byte length of the previous, present, or following elements. If a deviation were to be established between stored and measured byte length, an error is very probable. In this case, a variety of countermeasures may be initiated to reestablish the integrity and availability of the data. For example, error corrections may be performed on the basis of the provided real-time data 302a and 302b. In addition, users, producers, and service providers of the medical technology device may be informed about the error via a warning or an alarm or the medical technology device may be transferred into a safe state, in order to avoid further data loss.

Figure 4:
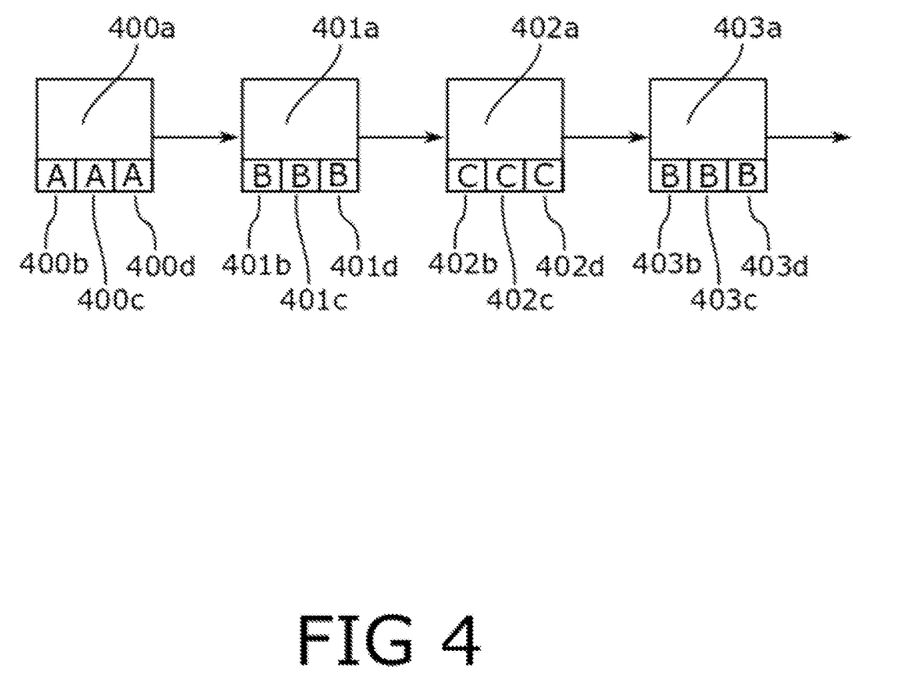
FIG. 4 schematically shows a storage block structure according to an embodiment of the invention.

FIG. 4 schematically shows a further embodiment of a data structure of real-time data. In this case, the storage units which are provided for the real-time data are assembled into storage blocks (400b, 400c, 400d). Storage blocks are larger data structures on the ring buffer memory, a sub-buffer memory, or on the storage medium, which include a fixed number of storage units. The number of the storage units which form a storage block may be established before startup of the medical technology device and also before, during, and after a treatment using the medical technology device. Additionally or alternatively, this may be dynamically adapted in running operation of the device, for example, if a modification or expansion of the recorded real-time data should make a change of the storage block size necessary. A change of the storage block size may in this case comprise a change with respect to the size in bytes or the number of storage units which form a storage block.

In a further embodiment, the storage blocks may be provided with a storage block identification code which has differentiable storage block identification statuses. In one example, the storage block identification statuses may include alphanumeric indices or symbols, so that a differentiation of the storage blocks on the basis of the storage block identification code can be enabled.

FIG. 4 shows a further embodiment, in which the storage blocks (400b, 401b, 402b) receive a storage block identification code, which is selected from at least three differentiable storage block identification statuses, for example, "A, B, C" or "A, B, C, D".

During a sequence (400a, 401a, 402a, 403a), all storage blocks of the ring buffer memory or the sub-buffer memory are transferred to the storage medium. A sequence is to be understood here as the complete transfer of the storage blocks from the ring buffer memory or one of the sub-buffer memories to the storage medium. A new sequence begins as soon as the first storage block is overwritten again on the ring buffer memory or one of the sub-buffer memories. This process repeats progressively so that a first sequence (400a) and further sequences (401a, 402a, 403a) following the first sequence result.

The storage blocks (400b-400d) within the first sequence (400a) have a first storage block identification status (A), wherein the further sequences (401a, 402a, 403a) are characterized in that the storage blocks within the further sequences (401a, 402a, 403a) each have storage block identification statuses (B, C) deviating from the storage block identification statuses (A) of the storage blocks (400b, 400c, 400d) of the first sequence (400a). Furthermore, the storage block identification statuses (B) of the storage blocks (401a, 401c, 401d) each differ from a sequence (401a) of the further sequences to a following sequence (402a). In FIG. 4, for example, the storage block statuses of the storage blocks of the first sequence 400a have the status A. The storage block statuses of the storage blocks of the second sequence 401a have the status B, wherein the storage blocks of the third sequence each have the storage block identification status C.

Furthermore, the storage block identification statuses of the storage blocks of the further sequences (401b-401d, 402b-402d, 403b-403d) form a repeating sequence of storage block identification statuses.

FIG. 4 shows an example of this for a ring buffer memory or sub-buffer memory each having three storage blocks. After multiple sequences, the sequence "A A A B B B C C C B B B C C C . . . " is transferred to the storage medium and stored by the repeating sequence of storage block identification statuses. It is apparent that the storage block identification statuses 400b, 400c, 400d of the first sequence 400a deviate from the storage block identification statuses of the storage blocks of following sequences 401a, 402a, 403a. The storage block identification statuses of the blocks within the further sequences 401a, 402a, 403a repeat progressively.

In an example having four different storage block identification statuses and one ring buffer memory or sub-buffer memory having only two storage blocks, after multiple sequences the sequence "A A B B C C D D B B C C D D B B . . . " is thus similarly transferred to the storage medium and stored.

The deviating first storage block identification state of the storage blocks of the first transferred storage sequence provides for significantly improved error recognition. During the initial filling of the ring buffer memory or one of the sub-buffer memories, the deviating first storage block identification status for each storage block within the storage sequence is only present in a single embodiment. As a result, in the case of an error-free writing process of the real-time data on the storage medium, it is to be presumed that the deviating status is only to be found in the first storage sequence on the storage medium, since ring buffer memory or sub-buffer memories are continuously overwritten. In case of error, for example, in the event of short-term interruptions of the voltage supply, in contrast, the first storage block identification status is identified in further storage sequences on the storage medium.

Additionally or alternatively, the data may be monitored on the ring buffer memory or the sub-buffer memory so that, for example, upon repeated identification of the first storage block identification status, actions may be initiated to prevent further data losses. Examples of this comprise warning messages to users, service technicians, producers, and/or a temporary abort of a treatment or setting the medical technology device in a safe state.

In a further embodiment, the real-time data may be encrypted and/or authenticated sector by sector to protect sensitive data, for example patient data, from accesses of unauthorized third parties. Examples of encryption technologies for encrypting real-time data include, for example, advanced encryption standard (AES) or Rivest-Shamir-Adleman (RSA).

The real-time data may furthermore be authenticated to assign them uniquely to a medical technology device, a patient, or a medical treatment and to prevent a manipulation of the real-time data. For example, a storage medium may be removed from a first medical technology device and connected to a second medical technology device. The real-time data generated by the second medical technology device would then subsequently be assigned incorrectly to the first medical technology device. Cryptographic nonces may be used for this purpose. A nonce refers in cryptography to alphanumeric values, for example counter readings, system times, or functions thereof, which can only be used once. A checksum may be generated on the basis of an arbitrary combination of device number, username, password or nonce and using a mathematical rule, and stored with the real-time data. Due to the use of a nonce, each checksum is different, so that a simple copy of already used checksums is inadequate for the purpose of an authentication. In this way, for example, data may be uniquely assigned to authorized persons or devices, since only they generally have knowledge of all initial input values.

In one embodiment, a storage area for authentication data may be provided in the storage units of the file system on ring buffer memory, sub-buffer memory, or storage medium which retain the real-time data. A storage area is to be understood here as a number of bytes by which a storage unit of a file system, for example a sector, is reduced by an established number of bytes. Authentication data may include here, for example, a non-forgeable checksum, which is generated from the encrypted and/or unencrypted real-time data, which are retained by reduced storage units, using known authentication algorithms Examples of such authentication algorithms are methods on the basis of secure hash algorithm 3 (SHA-3) or BLAKE, see, for example, Aumasson, Jean-Philippe (2021), Crypto Dictionary: 500 Tasty Tidbits for the Curious Cryptographer.

In one example, the real-time data which are retained on the reduced storage unit are encrypted and written together with the authentication data on the ring buffer memory, sub-buffer memory, or the storage medium. The authentication data are generated here from the encrypted and/or unencrypted real-time data using an authentication algorithm. Storage units, which provide a storage area for authentication data and an abbreviated storage area for real-time data, may then be stored on the ring buffer memory, sub-buffer memory, and/or the storage medium. If the cryptographic key, the authentication algorithm, and additional values such as the nonce used are known, it is possible to generate or reproduce authentication data, for example the checksum. Individual storage units may be assigned in a forgery-proof and unique manner to a medical technology device, a medical treatment, or a user on the basis of this checksum. This is enabled in that the authentication data, for example the checksum, is reproduced from the real-time data stored in the sectors, the specific nonce, and the knowledge of the cryptographic method used, and is compared to the authentication data stored in the storage unit.

If a check of the authentication data has the result that real-time data stored on a storage medium have been generated by another medical technology device, various actions can be initiated as an immediate consequence. For example, an alarm may be triggered, a warning message may be displayed on an output device, or the producer of the medical technology device or a service technician may be informed. Alternatively or additionally, the medical technology device may be transferred into a safe state. A suitable data transfer between the medical technology device and an external communication partner, for example a service technician, may be performed, for example, via mobile wireless, Wi-Fi, or Ethernet.

The encryption and authentication of individual storage units ensures that even in the case of unpredicted events, for example in the case of power failures, availability, authenticity, and encryption of the real-time data are ensured.

Methods according to the invention may also be carried out by an independent separate device. Such a separate device includes a data interface for transferring or reading out the sensor data from a further device, for example a medical technology device as described above, a data interface for transferring the sensor data to a storage medium, and a processor, wherein the processor is configured to execute at least one of the methods according to the invention.

It will be appreciated that the execution of the various machine-implemented processes and steps described herein may occur via the execution, by one or more respective processors, of processor-executable instructions stored on one or more tangible, non-transitory computer-readable mediums (such as random access memory (RAM), read-only memory (ROM), programmable read-only memory (PROM), and/or another electronic memory mechanism).

Thus, for example, operations performed by a medical technology device or a control device as discussed herein may be carried out according to instructions stored on and/or applications installed on one or more respective computing devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for failsafe storage of real-time data relating to a medical treatment, comprising:
   temporarily storing the real-time data in a ring buffer memory;
   pre-allocating a set of storage units of a storage medium, which is supplied with an operating voltage, for storing the real-time data in a file system; and
   based on the operating voltage of the storage medium being within a predefined reference range, transferring the real-time data from the ring buffer memory to the storage medium, wherein the real-time data is transferred from the ring buffer memory to the storage medium according to an order comprising a plurality of sequences, wherein the order includes a first sequence followed by a repeating pattern of two or more further sequences, wherein the two or more further sequences comprise at least a second sequence and a third sequence, wherein the first sequence comprises at least two storage blocks having a first storage block identification code, wherein the second sequence comprises at least two second storage blocks having a second storage block identification code, and wherein the third sequence comprises at least two third storage blocks having a third storage block identification code.

2. The method according to claim 1, wherein the file system is formatted as a file allocation table (FAT), extended file allocation table (exFAT), or new technology file system (NTFS).

3. The method according to claim 1, wherein the real-time data contain metadata.

4. The method according to claim 3, wherein the metadata comprises:
   recording information data;
   section information data; and/or
   a physical sector number.

5. The method according to claim 1, wherein the real-time data comprises individual elements, and wherein the individual elements comprise an element code, a data length of current element, and/or data recorded in conjunction with a medical treatment.

6. The method according to claim 1, wherein the ring buffer memory is divided into multiple sub-buffer memories.

7. The method according to claim 6, wherein at least one sub-buffer memory provides storage units for data relating to a medical treatment, one sub-buffer memory provides storage units for metadata, and one sub-buffer memory provides storage units for command data.

8. The method according to claim 7, wherein the storage units of the sub-buffer memory for data relating to the medical treatment are temporarily stored together with the storage units of the sub-buffer memory for the command data.

9. The method according to claim 7, wherein the storage units of the sub-buffer memory for the metadata are temporarily stored together with sectors of the sub-buffer memory for the command data.

10. The method according to claim 1, wherein the storage units which retain the real-time data are each encrypted and/or authenticated; and/or
    wherein at least one storage area of a storage unit which retains real-time data is provided for authentication data.

11. A method for failsafe storage of real-time data, comprising:
    temporarily storing the real-time data in a ring buffer memory;
    pre-allocating a set of storage units of a storage medium, which is supplied with an operating voltage, for storing the real-time data in a file system; and
    based on the operating voltage of the storage medium being within a predefined reference range, transferring the real-time data from the ring buffer memory to the storage medium, wherein the real-time data is transferred from the ring buffer memory to the storage medium according to an order comprising a plurality of sequences, wherein the order includes a first sequence followed by a repeating pattern of two or more further sequences, wherein the two or more further sequences comprise at least a second sequence and a third sequence, wherein the first sequence comprises at least two storage blocks having a first storage block identification code, wherein the second sequence comprises at least two second storage blocks having a second storage block identification code, and wherein the third sequence comprises at least two third storage blocks having a third storage block identification code.

12. The method according to claim 11, wherein the file system is formatted as a file allocation table (FAT), an extended file allocation table (exFAT), or a new technology file system (NTFS).

13. The method according to claim 11, wherein the real-time data comprises metadata.

14. The method according to claim 13, wherein the metadata includes:
    recording information data;
    section information data; and/or
    a physical sector number.

15. The method according to claim 11, wherein the real-time data comprises individual elements, wherein the individual elements comprise an element code, a data length of a current element, and/or data recorded in conjunction with a medical treatment.

16. The method according to claim 11, wherein the ring buffer memory is divided into multiple sub-buffer memories.

17. The method according to claim 16, wherein at least one sub-buffer memory provides storage units for data relating to a medical treatment, at least one sub-buffer memory provides storage units for metadata, and at least one sub-buffer memory provides storage units for command data.

18. The method according to claim 16, wherein at least one sub-buffer memory provides storage units for data relating to a medical treatment, at least one sub-buffer memory provides storage units for metadata, and at least one sub-buffer memory provides storage units for command data; and
wherein the storage units of the at least one sub-buffer memory for the data relating to the medical treatment are temporarily stored together with the storage units of the at least one sub-buffer memory for the command data.

19. The method according to claim 16, wherein at least one sub-buffer memory provides storage units for data relating to a medical treatment, at least one sub-buffer memory provides storage units for metadata, and at least one sub-buffer memory provides storage units for command data; and
wherein the storage units of the at least one sub-buffer memory for the metadata are temporarily stored together with the storage units of the at least one sub-buffer memory for the command data.

20. The method according to claim 11, wherein the storage units which retain the real-time data are each encrypted and/or authenticated.

21. The method according to claim 11, wherein at least one storage area of a storage unit which retains real-time data is provided for authentication data.

22. A device, comprising:
sensors configured for recording real-time data;
a data interface configured for data transfer of the real-time data;
a storage medium configured to be supplied with an operating voltage and written with the real-time data via the data interface, wherein a set of storage units of the storage medium is pre-allocated for storing the real-time data in a file system of the storage medium; and
a ring buffer memory configured for temporarily storing the real-time data;
wherein the device is configured to transfer the real-time data from the ring buffer memory to the storage medium based on a measured value of the operating voltage being within a predefined reference range, wherein the real-time data is transferred from the ring buffer memory to the storage medium according to an order comprising a plurality of sequences, wherein the order includes a first sequence followed by a repeating pattern of two or more further sequences, wherein the two or more further sequences comprise at least a second sequence and a third sequence, wherein the first sequence comprises at least two storage blocks having a first storage block identification code, wherein the second sequence comprises at least two second storage blocks having a second storage block identification code, and wherein the third sequence comprises at least two third storage blocks having a third storage block identification code.

23. The device according to claim 22, wherein the device is a hemodialysis, hemofiltration, hemodiafiltration, peritoneal dialysis, apheresis or plasmapheresis device.

24. A non-transitory computer-readable medium having processor-executable instructions stored thereon for failsafe storage of real-time data, wherein the processor-executable instructions, when executed, facilitate:
temporarily storing the real-time data in a ring buffer memory;
pre-allocating a set of storage units of a storage medium, which is supplied with an operating voltage, for storing the real-time data in a file system; and
based on the operating voltage of the storage medium being within a predefined reference range, transferring the real-time data from the ring buffer memory to the storage medium, wherein the real-time data is transferred from the ring buffer memory to the storage medium according to an order comprising a plurality of sequences, wherein the order includes a first sequence followed by a repeating pattern of two or more further sequences, wherein the two or more further sequences comprise at least a second sequence and a third sequence, wherein the first sequence comprises at least two storage blocks having a first storage block identification code, wherein the second sequence comprises at least two second storage blocks having a second storage block identification code, and wherein the third sequence comprises at least two third storage blocks having a third storage block identification code.

* * * * *